Aug. 20, 1946.           J. E. LILL                2,406,230
                    TRACTOR SPROCKET DRIVE
                    Filed Sept. 4, 1944          3 Sheets-Sheet 1
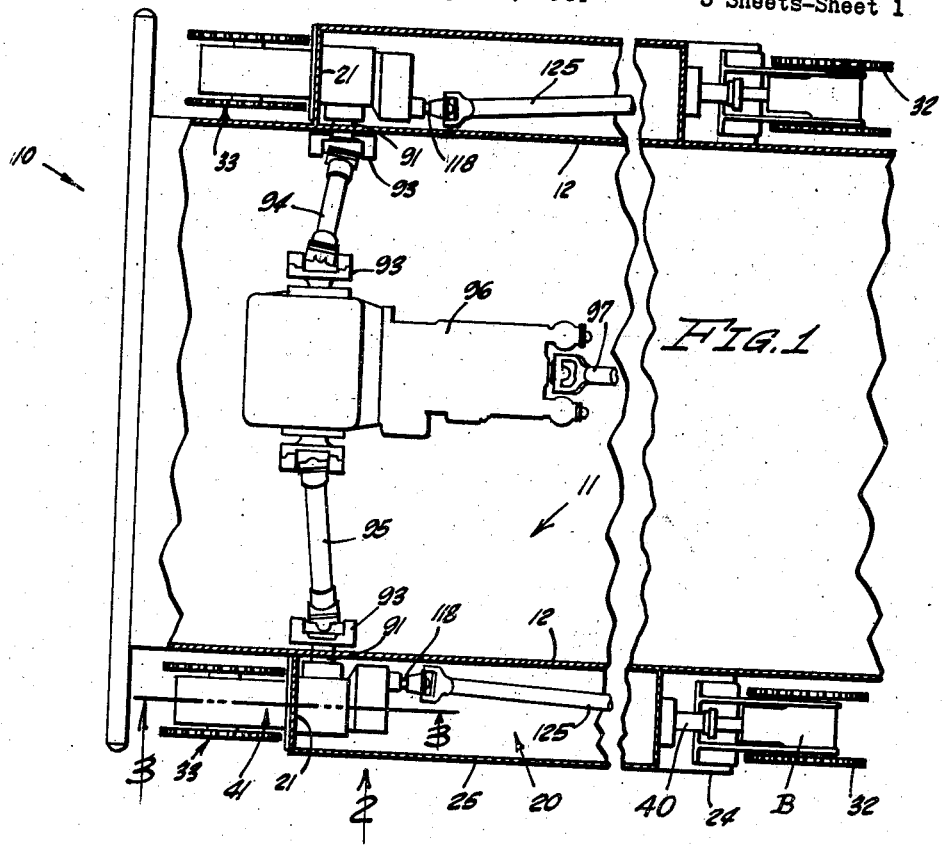
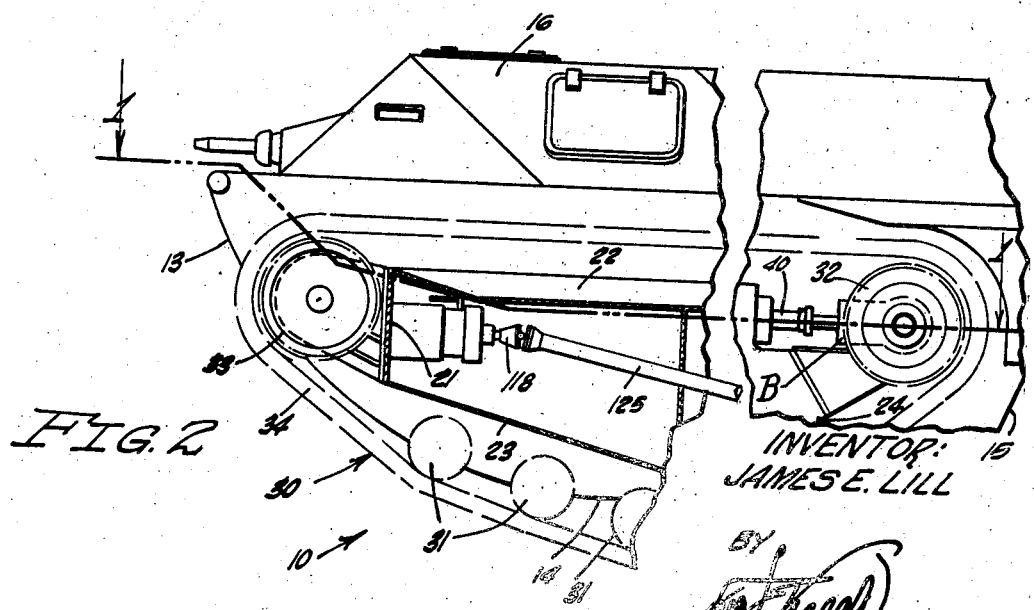
INVENTOR:
JAMES E. LILL
ATTORNEY Aug. 20, 1946.　　　　J. E. LILL　　　　2,406,230
TRACTOR SPROCKET DRIVE
Filed Sept. 4, 1944　　　　3 Sheets-Sheet 2

INVENTOR:
JAMES E. LILL
BY
ATTORNEY

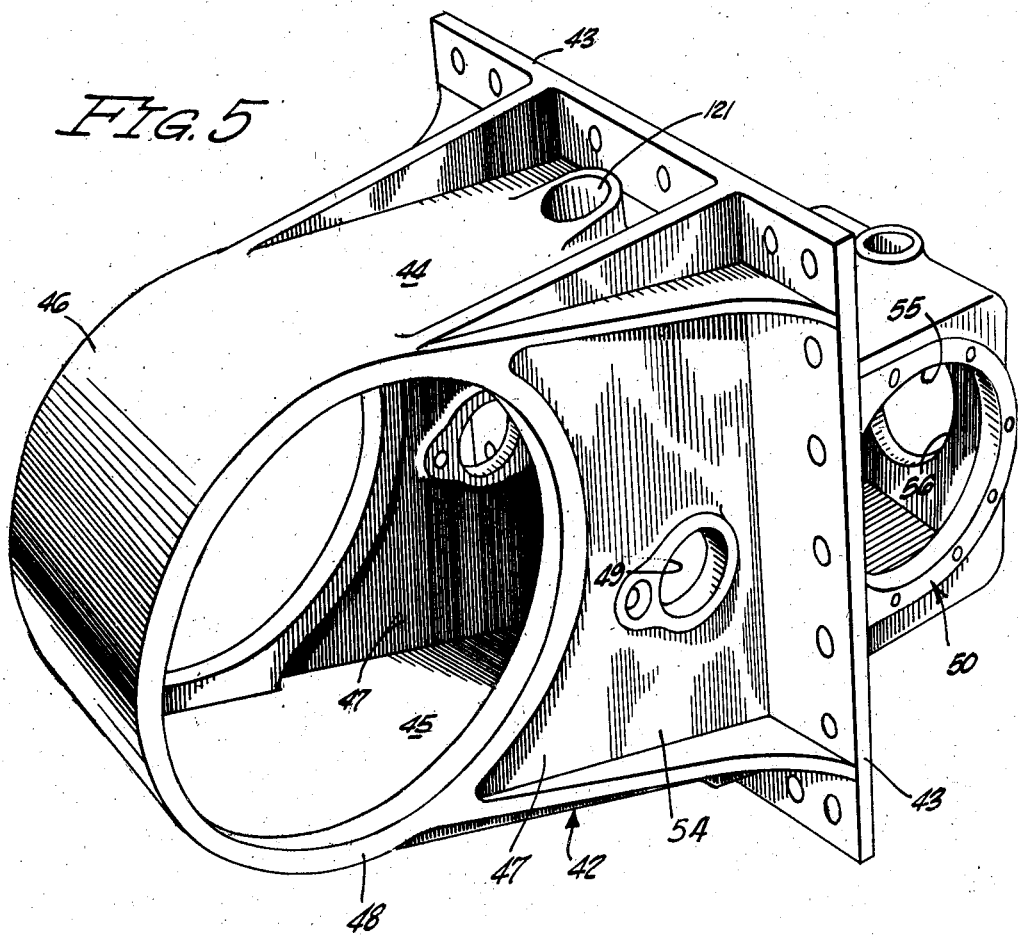

Patented Aug. 20, 1946

2,406,230

UNITED STATES PATENT OFFICE 2,406,230

TRACTOR SPROCKET DRIVE

James E. Lill, Los Angeles, Calif., assignor to Food Machinery Corporation, San Jose, Calif., a corporation of Delaware Application September 4, 1944, Serial No. 552,684

5 Claims. (Cl. 180—9.1)

This invention relates to power transmissions and is particularly useful in driving a drive sprocket in a track laying vehicle.

Track laying mechanisms are employed on commercial tractors and military tanks and amphibians and each of these includes a flexible endless track which is trained about front and rear drive and idle sprockets, and a series of bogie wheels which ride on the lower flight of the track and thus support the vehicle.

To increase the service performance characteristics of tractor type military vehicles the leading sprockets in the track laying mechanisms thereof are placed forward to a point where these inevitably receive severe shocks due to the vehicle nosing into dirt embankments, rocks or other obstacles in the effort to push these out of the way or ride over them. In certain vehicles it has been found advantageous to drive the track laying mechanisms from the leading sprockets and a problem is here introduced of placing the drive sprockets far enough forward so that the tracks, where they pass around the drive sprockets, will engage and have traction on an embankment or other obstacle into which the vehicle is nosing.

It is an object of this invention to provide a mounting for a tractor drive sprocket which may be located at the front end of the track laying mechanism and which may be set in a sufficiently advanced position to provide traction on an obstacle as mentioned.

It is another object of this invention to provide a tractor sprocket drive embodying a mounting for the sprocket which will employ the material used therein to especial advantage in withstanding shocks from ramming against obstacles.

In a common type of tractor amphibian known as the "Water Buffalo" the sides of the hull are provided with pontoons which lie within the endless tracks of the track laying mechanisms. The rear ends of these pontoons are employed for mounting the idle sprockets of the track laying mechanisms. Heretofore, the drive sprockets of these amphibians have been mounted on bell housings extending laterally from the hull ahead of said pontoons.

It is another object of this invention to provide a tractor sprocket drive on which the drive sprockets in said "Water Buffalo" may be mounted and these sprockets driven from the front ends of said pontoons, thereby interposing a rigid compression structure between the front and rear sprockets of each track laying mechanism which will greatly increase the capacity of these track laying mechanisms to withstanding the shocks mentioned hereinabove.

The manner of accomplishing the foregoing objects as well as further objects and advantages will be made manifest in the following description taken in connection with the accompanying drawings in which:

Fig. 1 is a fragmentary diagrammatic plan view of an amphibian incorporating a preferred embodiment of the track laying mechanism of my invention, and is partially broken away substantially as indicated by line 1—1 of Fig. 2 to reveal the internal construction of said amphibian.

Fig. 2 is a side elevational view of Fig. 1.

Fig. 5 is a perspective view showing the main gear housing of the invention.

Figure 3:
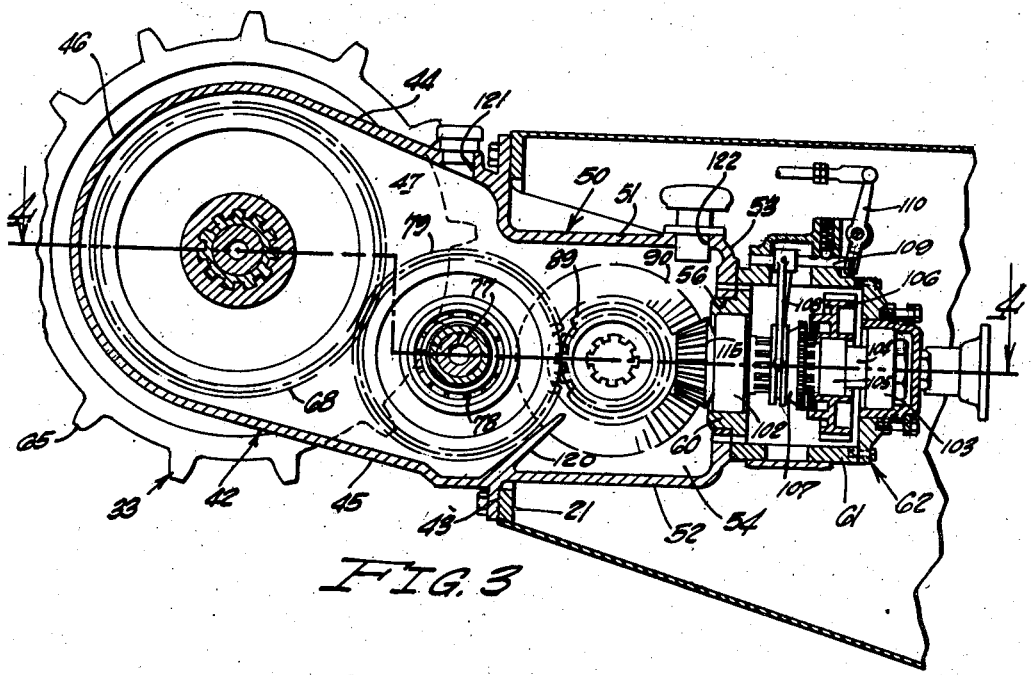
Fig. 3 is a vertical sectional view of the tractor sprocket drive of my invention taken on the line 3—3 of Fig. 1.
Figure 4:
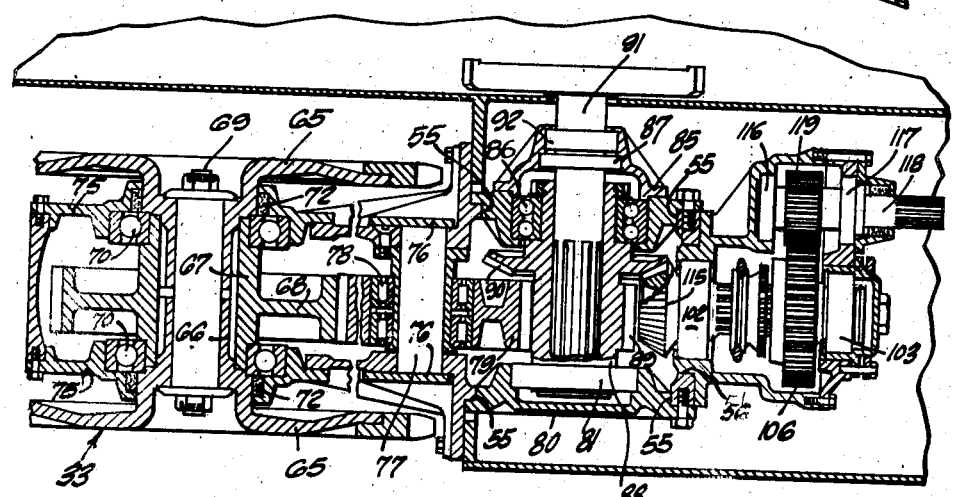
Fig. 4 is a horizontal sectional view on stepped levels as indicated by the line 4—4 in Fig. 3.

Referring specifically to the drawings the invention is disclosed as incorporated with an amphibian 10 comprising a hull 11 having sides 12, a curved bow 13, a bottom 14 and a stern plate 15. Provided in the hull 11 is a pilot's compartment 16.

Assembled upon the sides 12 to extend outwardly therefrom are pontoons 20 each of which has a front wall 21, top wall 22, a bottom wall 23, a rear wall 24 and an outside wall 25. Mounted on each of the pontoons 20 is a track laying land-traction and water-propulsion mechanism 30 which includes a series of bogie wheels 31 which are rotatably supported in any prefered manner on the pontoon bottom 23. Each such mechanism also includes a double idle sprocket 32, and a double drive sprocket 33, these sprockets being located at opposite ends of the hull 11, and an endless double chain track 34 which is trained about the sprockets 32 and 33 and the bogie wheels 31.

The double idle sprocket 32 is rotatable on a base B which is slideably mounted on the rear end of the pontoon 20 (see Fig. 2) and is shiftable horizontally by a jack 40 to loosen or tighten the endless track 34.

The double drive sprocket 33 of this invention is mounted on the front end of the pontoon 20 so as to provide a continuous compression member which lies along and on opposite sides of the axis of the operational compressive forces applied by the track 34 to the two double sprockets 32 and 33, tending to force one of these towards the other. Such compressive forces include strains caused by the driving of the track or shocks caused by head on collisions with obstacles in the path of the amphibian 10.

To effect this purpose, my invention preferably includes a drive sprocket mounting and driving device 41 which is mounted on the front pontoon wall 21. These devices are reverse duplicates of each other so that a description of the left device which follows will suffice for both.

The left device 41 includes a main housing 42 having an attachment flange 43 by casting 42 having an attachment flange 43 by which the casting 42 is secured to the front pontoon wall 21 as by bolts or rivets. The housing 42 has a top wall 44 and a bottom wall 45 extending forwardly from the flange 43 and uniting with a curved front wall 46. The walls 44, 45 and 46 are united integrally by side walls 47 which are provided with pairs of axially disposed holes 48 and 49.

The housing 42 also includes a compartment 50 extending rearwardly from the perimetric flange 43 and having an upper wall 51, a bottom wall 52 and a rear wall 53 which are connected by side walls 54, the latter having coaxial openings 55 therein.

The rear wall 53 is provided with an opening 56. This opening is adapted to receive a neck 60 of a box 61 of a power take-off unit 62. The invention is adapted to be employed with or without the unit 62 and when this unit is dispensed with the opening 56 is covered with a suitable plate.

The double drive sprocket 33, which the device 41 is provided for mounting and driving, comprises individual sprockets 65 having splined hub sleeves 66 which extend into and mesh with an internally splined hub 67 of a gear 68. The sprockets 65 are held in assembly with the hub 67 by a bolt 69 which also traps bearings 70 between the hub 67 and the sprockets 65.

Secured to the side walls 47 of the housing 42 so as to close the openings 48 therein and rigidly position the assembled sprocket 65, gear wheel 68 and bearing 70, are cover plates 75.

Secured in the openings 49 by plates 76 is an idle shaft 77 on which is provided a bearing 78 mounting a countergear wheel 79, the latter meshing with the gear wheel 78. Fixed to the outer side wall 54 and extending into its opening 55 is a bearing support cap 80 in which a bearing 81 rests. Fixed to the inner side wall 54 so as to extend into the inner opening 55 is a cap 85 which houses bearings 86 and 87.

Rotatably mounted in the bearings 81 and 86 is a sleeve 88 having a pinion gear 89 formed thereon as well as a bevel gear 90. The pinion gear 89 meshes with the countergear wheel 79. The interior of the sleeve 88 is splined and a differential drive shaft 91 which is internally splined extends into the sleeve 88 in splined driving relation therewith. The shaft 91 also journals in the bearing 87. A suitable packing ring 92 is provided in the cap 85 about the shaft 91.

The shafts 91 of the two mounting and driving devices 41 connect through universal joints 93 and drive rods 94 and 95 with a selective gear transmission 96 to which power is delivered through a drive shaft 97 from an internal combustion motor (not shown).

The mechanism already described in detail may be employed, for mounting and driving the double drive sprockets 33 without the power take-off unit 62. This unit 62 is employed whenever it is desired to supply power within the pontoons 20 concurrently with the driving of the track laying mechanisms 30 of the amphibian 10. One such instance is where propellers are mounted in these pontoons in the manner and for the purpose disclosed in the co-pending application of James M. Hait, Serial No. 554,989, filed September 20, 1944.

The box 61 of the power take-off unit 62 supports bearings 102 and 103 in which is journaled a shaft 104 carrying a bearing 105 on which a clutch gear 106 is freely rotatable. Splined on the shaft 104 is a clutch collar 107 which is shiftable by a yoke 108 into and out of clutching engagement with the gear 106. The yoke 108 is fixed on a slide shaft 109 mounted in the box 61 and shiftable by a manually controlled lever 110.

Fixed on the inner end of the shaft 104 so as to mesh with the bevel gear 90 is a bevel pinion 115. The box 61 also provides bearings 116 and 117 for a power take-off shaft 118 having a pinion 119 which meshes with the gear 106.

Each device 41 may be lubricated by the splash system. To effect this and for inspection purposes, the housing 42 is provided with an oil baffle 120 and with plugged ports 121 and 122 through which oil may be introduced and the mechanism inspected when desired.

*Operation*

With the above description it is believed clear that each device 41 mounted, as it is, right on the head end of one of the pontoons 20, provides a rigid support for its drive sprocket 33 and resists head-on shocks imposed on the drive sprocket with forces which are disposed symmetrically with respect to the axis along which the shocks are imposed. It is evident that for the amount of material employed in the drive sprocket support 41, this is very much stronger and more able to resist such shocks than the bell housing sprocket supports in previous use and referred to hereinabove.

In operating the amphibian 10 the pilot utilizes the transmission 96 to selectively drive the port and starboard track laying mechanisms 30. Each of these mechanisms are driven, of course, by rotation of its shaft 91 which has a splined connection with the pinion 89 so that the latter rotates with this shaft. Through this pinion's meshing with gear 78, and the latter meshing with gear 68, the sprocket 33 is rotated.

When the devices 41 are employed on amphibians it is, of course, desirable that these be as light as possible while, at the same time, have the necessary strength. For this reason I prefer to cast the housing 42 of each of these devices from steel. The cover plates 75, the bearing support caps 80 and 85 and the power take-off box 61, I find may advantageously be made of a suitable aluminum alloy.

When the devices 41 have power take-off units 62 associated therewith, as shown in the drawings, power may be transmitted from the take-off shafts 118 through drive rods 125 to whatever mechanisms require driving.

The claims are as follows:

1. In a tractor type vehicle, the combination of: a double tractor drive sprocket having spaced individual sprockets connected axially by hub means; spaced bearings surrounding said hub means between said individual sprockets; a housing extending between said individual sprockets and providing a mounting for said bearings; means disposed radially outside the periphery of said double sprocket for rigidly supporting said housing; and means extending into said housing and operatively connected to said hub means for rotating said double sprocket.

2. In a tractor type vehicle, the combination of: a double drive sprocket including spaced individual sprockets connected by a hub; a double idle sprocket comprising spaced individual sprockets connected by a hub; a flexible endless track trained about said double sprockets; bearing means for said hubs; a compression structure disposed between said drive sprocket and said idle sprocket and lying on opposite sides of the plane bisecting the space between said individual sprockets; means on said compression structure extending between said individual sprockets of each of said double sprockets and rigidly supporting the bearing means thereof on said compression structure; and means extending from said compression structure into the space between the bearings of said double drive sprocket for rotating the latter.

3. In a tractor type vehicle the combination of: a double drive sprocket including spaced individual sprockets and axle means connecting said individual sprockets together; spaced bearings surrounding said axle means between said individual sprockets; means lying between said individual sprockets and extending towards said bearings from a position disposed radially outside the periphery of said sprocket for rigidly supporting said bearings; and drive means disposed between said bearing supports and mounted on said axle means between said bearings for rotating said double drive sprocket.

4. A combination as in claim 3 in which said axle rotating means includes a gear mounted on said axle means between said bearings.

5. A combination as in claim 3 in which said drive means comprises a train of gears, one of which is mounted on said axle means between said bearings.

JAMES E. LILL.